US009721183B2

(12) United States Patent
Heller et al.

(10) Patent No.: US 9,721,183 B2
(45) Date of Patent: Aug. 1, 2017

(54) INTELLIGENT DETERMINATION OF AESTHETIC PREFERENCES BASED ON USER HISTORY AND PROPERTIES

(71) Applicant: HULU, LLC, Santa Monica, CA (US)

(72) Inventors: Noah Raymond Heller, Seattle, WA (US); James Theodore Bartot, Seattle, WA (US); David Ballantyne Christianson, Seattle, WA (US); Jason Hayes Christensen, Seattle, WA (US); Schuyler Cullen, San Jose, CA (US); Hugh Crean, Boston, MA (US); Navdeep Singh Dhillon, Seattle, WA (US); Samuel J S Fu, Los Angeles, CA (US); Craig Bruce Horman, Seattle, WA (US)

(73) Assignee: HULU, LLC, Santa Monica, CA (US)

( * ) Notice: Subject to any disclaimer, the term of this patent is extended or adjusted under 35 U.S.C. 154(b) by 289 days.

(21) Appl. No.: 14/610,955

(22) Filed: Jan. 30, 2015

(65) Prior Publication Data
US 2015/0220806 A1 Aug. 6, 2015

Related U.S. Application Data

(60) Provisional application No. 61/933,920, filed on Jan. 31, 2014.

(51) Int. Cl.
*G06K 9/62* (2006.01)
*G06K 9/46* (2006.01)
*G06F 17/30* (2006.01)

(52) U.S. Cl.
CPC ....... *G06K 9/4676* (2013.01); *G06F 17/3053* (2013.01); *G06F 17/30247* (2013.01);
(Continued)

(58) Field of Classification Search
CPC .. G06K 9/4676; G06K 9/6262; G06K 9/6263; G06F 17/3053; G06F 17/30247; G06F 17/30867; G06F 17/30268
See application file for complete search history.

(56) References Cited

U.S. PATENT DOCUMENTS

| 8,060,906 B2 * | 11/2011 | Begeja | G06F 17/30017 |
| | | | 725/13 |
| 8,867,849 B1 * | 10/2014 | Kirkham | G06F 17/30268 |
| | | | 382/224 |

(Continued)

OTHER PUBLICATIONS

International Preliminary Report on Patentability for PCT Application PCT/US2015/013847 mailed Aug. 11, 2016, 8 pages.
(Continued)

*Primary Examiner* — Gregory M Desire
(74) *Attorney, Agent, or Firm* — Fountainhead Law Group P.C.

(57) ABSTRACT

Techniques for selecting a digital image are disclosed. The techniques may include receiving a first set of digital images, analyzing the first set of digital images to extract first image features from each of the first set of digital images, accessing a user profile, comparing the extracted first image features to a preset list of image features, ranking each digital image of the first set, selecting each digital image having a ranking that exceeds a threshold, assigning a category to each selected digital image based on a comparison of each selected digital image to a category database of digital image categories, displaying each selected digital image with the assigned category, receiving an input from the user in response to the displaying, updating the user profile and the category database based on the input, and selecting at least one subsequent digital image based on the updated user profile and category database.

20 Claims, 11 Drawing Sheets

(52) U.S. Cl.
CPC .. *G06F 17/30268* (2013.01); *G06F 17/30867* (2013.01); *G06K 9/6262* (2013.01); *G06K 9/6263* (2013.01); *G06K 2009/6213* (2013.01)

(56) References Cited

U.S. PATENT DOCUMENTS

| | | | |
|---|---|---|---|
| 9,113,208 B2* | 8/2015 | Belyaev | H04N 21/25841 |
| 9,397,974 B1* | 7/2016 | Gross | H04L 51/32 |
| 2005/0207622 A1* | 9/2005 | Haupt | G06K 9/00288 |
| | | | 382/118 |
| 2007/0182861 A1 | 8/2007 | Luo et al. | |
| 2007/0242138 A1 | 10/2007 | Manico et al. | |
| 2008/0306995 A1 | 12/2008 | Newell et al. | |
| 2009/0113496 A1* | 4/2009 | Kummer | H04N 7/17327 |
| | | | 725/87 |
| 2010/0177956 A1 | 7/2010 | Cooper et al. | |
| 2012/0210232 A1 | 8/2012 | Wang et al. | |
| 2013/0101219 A1 | 4/2013 | Bosworth et al. | |
| 2013/0290337 A1* | 10/2013 | Lansford | G06F 17/30598 |
| | | | 707/738 |
| 2013/0301934 A1 | 11/2013 | Cok | |
| 2014/0010464 A1 | 1/2014 | Umeda et al. | |
| 2014/0032359 A1 | 1/2014 | Dewangan | |
| 2015/0220806 A1* | 8/2015 | Heller | G06K 9/4676 |
| | | | 382/159 |
| 2016/0180467 A1* | 6/2016 | Griffin | G06Q 40/08 |
| | | | 705/4 |

OTHER PUBLICATIONS

International Search Report and Written Opinion issued by the United States Patent and Trademark Office as International Searching Authority for International Application No. PCT/US2015/013847 mailed May 1, 2015 (10 pages).

* cited by examiner

INTELLIGENT DETERMINATION OF AESTHETIC PREFERENCES BASED ON USER HISTORY AND PROPERTIES

CROSS-REFERENCE

This application claims the benefit of U.S. Provisional Application No. 61/933,920, filed Jan. 31, 2014, the entire contents of which are herein incorporated by reference.

BACKGROUND

Many computing devices are equipped with integrated cameras capable of taking photos or videos. These cameras are especially useful in the case of mobile computing devices such as smartphones, which a user may tend to have with him or her when interesting opportunities for taking a photo or a video present themselves. As mobile devices have continued to proliferate, and as platforms for sharing photos and videos have been created and become popular, the availability of these materials is ever-increasing. With such a large number and variety of photos and videos, it is difficult to identify and make available content that appeals to a given user. This problem is exacerbated by the individual tastes of each user.

SUMMARY

The present disclosure relates to improved methods and systems for selection by a computing device of individual images and/or video clips (i.e., "segments") from within a video that are most appealing to a user, according to some specified set of tests and/or metrics. A video clip may be a time-based sequence of images of any length, but often may have a relatively short length of 5-10 seconds. This disclosure describes computer-implemented methods and systems that may be used, in whole or in part, to improve the selection of images and video clips from within a video, and also to improve the assignment and ease of assignment of correct metadata to images and video clips by a user. The term metadata refers to information about an image or video clip and may include one or more "hashtags," which are often expressed as text labels starting with a pound sign "#" and used to identify a specific topic related to an image or video clip. Hashtags may be added or selected by a user during user interaction with a social-media related computer application and/or web-based service such as the computer application and web-based service disclosed herein. The present disclosure also relates to methods for ranking the level and/or quality of activity and feedback generated by an image or video clip posted to a social interaction web site, and for operating contests based on the level and quality of activity and feedback.

In a typical application of the methods and systems described by present disclosure, the origin of a video may be a camera in a user's tablet or smartphone mobile computing device. The video may be recorded (i.e., "captured") by the camera and stored locally on the device or externally (e.g., in the "cloud"). The video may also be uploaded to a storage or social media website. Either during recording or sometime later, the video is analyzed according to methods described herein to select individual images and/or video clips from within the video for the user to store, post or consume as desired. A "computing device" may refer to one or more electronic devices with computing power contained within, in one or more locations, each either stationary or mobile, possibly including smartphones, tablets, wearable computing devices (e.g., wearable glasses devices such as GOOGLE GLASS), laptops, PCs, workstations and/or servers. A typical computing device may be a single mobile platform such as a smartphone or a tablet.

While the below descriptions refer to images for simplicity, the goals and associated descriptions also apply to video clips. For example, this disclosure relates to selecting, presenting, categorizing, ranking, processing, analyzing and assigning hashtags to video clips in addition to performing these same processing steps for images.

A first goal is improved selection of images from within a given video based on adaptive learning of a user's selections or rejections of prior images or proposed prior images with similar characteristics as the current image. The improved selection may also utilize feedback about an image from any number of other people or entities (i.e., not necessarily users of the system analyzing the video), such feedback including positive or negative comments or selections, or counts thereof, from social media websites to which the image is posted (e.g., "likes" on a social media website such as FACEBOOK).

A second goal is improved selection of hashtags to be associated with a current image based on adaptive learning of one or more of a user's selections of hashtags or rejections of proposed hashtags for prior images.

A third goal is improved selection of hashtags to be associated with a current image based on hashtags associated with other images that have similar characteristics as the current image. The other images may be retrieved from social media web sites and web-based services. The selection method may also use metadata that may be retrieved along with the images such as camera location at the time of capture, metrics that rank activity and popularity, and information about the users who posted or are associated with each retrieved image.

A fourth goal is improved rank ordering and selection of a set of image recognition categories, also known as a dictionary of categories. One or more categories from a dictionary may be matched to an image, sections of an image, and/or objects within an image. Example categories are "dog," "car," "tree," or "birthday party." In some embodiments of the present disclosure, there may be more than a million categories in such a dictionary. A username may also represent a separate category, such that a username category comprises the images posted by or attributable to a given user. In some use cases a hashtag may be mapped to one or more categories, and in other use cases a category may be mapped to one or more hashtags.

A fifth goal is improved adaptive post-processing of images prior to presentation to a user for viewing, based on adaptive learning of user selection or rejection of one or more post-processing operations for prior images with similar characteristics.

A sixth goal is improved processing of images to determine image quality based on the following: analysis of camera motion data taken at the time of image capture from a built-in sensor such as an accelerometer or gyroscope, analysis of camera location from a location device such as a GPS sensor used in conjunction with a location service, analysis of audio recorded by the camera around the time of image capture, or any other available data related to an image or video.

A seventh goal is improved ranking of images posted to third-party social media websites by a social media service provided to a user, the social media service operating as a pass-through service to third-party social media websites (e.g., FACEBOOK, FLICKR or INSTAGRAM), and optionally, operating as a standalone service and repository of user-posted images. Such a social media service may track the activity level and other available metrics about images posted to third-party social media websites and use said activity level and other available metrics to rank order the images for purposes of providing improved social media services to end users. In general, images with significant activity level and metrics indicating high appeal may be given higher importance or weight when providing feedback to improve the training and operation of the methods described herein (and in particular for achieving the goals described above). Rankings may be used to determine the results of "contests" in which users are rewarded for posting images that rank high or highest according to specific criteria of a given contest, such as "photo of the day" or "best pet photo this weekend."

An eighth goal is improved image quality of images within a captured video based on user interaction with a camera device during recording. For example, user interaction with a touch screen display that shows the video as it is recorded may be used to adjust camera operation in a way that improves the quality of subsequently captured images. Other recording device inputs such as physical buttons or audio captured during recording may also be used to adjust camera operation.

Techniques for selecting digital images are disclosed. In some embodiments, the techniques may be realized as a system for selecting a digital image, the system comprising: a receiving unit that receives a first set of digital images; an image processor that analyzes the first set of digital images to extract first image features from each of the first set of digital images; a user profile access unit that accesses a user profile stored in a memory, wherein the user profile comprises a preset list of image features corresponding to a second set of digital images previously selected by a user; an image comparing unit that compares the extracted first image features to the preset list of image features; an image ranking unit that ranks each digital image of the first set based on the comparison; a selecting unit that selects each digital image from the first set having a ranking that exceeds a threshold; an assigning unit that assigns a category to each selected digital image based on a comparison of each selected digital image to a prestored category database of digital image categories; a display device that displays each selected digital image with the assigned category; an input receiving unit that receives an input from the user in response to the displaying of each selected digital image and the assigned category; and an updating unit that updates the user profile and the category database in accordance with the input, wherein the selecting unit further selects at least one subsequent digital image from a third set of digital images based on the updated user profile and category database.

In accordance with additional aspects of this embodiment, the ranking unit ranks each digital image of the first set based further on camera information of a camera that captured the first set of digital images.

In accordance with further aspects of this embodiment, the digital images of the first set are still digital images or digital images within a video clip.

In accordance with additional aspects of this embodiment, the receiving unit receives the digital images of the first set directly from the camera, from another memory in a prestored format, or from a website, and wherein the first set of digital images are associated with one of a plurality of users.

In accordance with further aspects of this embodiment, the image processor is further configured to: calculate an image metric for each digital image, wherein the image metric includes at least one of brightness, contrast, blur, and spectral measurements; identify objects in each digital image; classify the identified objects in each digital image; and determine a distribution and location of the identified objects in each digital image, wherein the comparison of the extracted first image features to the preset list of image features is based on the calculated image metric, the identified objects, the object classification, and the determined distribution and location of the identified objects.

In accordance with additional aspects of this embodiment, the user profile stores an indication of whether the user liked or disliked each digital image of the second set of digital images.

In accordance with additional aspects of this embodiment, the selecting unit selects each digital image from the first set based further on feedback from other users on the second set of digital images previously selected by the user.

In accordance with further aspects of this embodiment, the system may further include a posting unit that posts one of the selected digital images from the first set or the second set to a website based on the user input.

In accordance with additional aspects of this embodiment, the system may further include an activity analysis unit that analyzes activity of users on the website, wherein the website is a social networking website; a post ranking unit that generates a post ranking of specific activity on the website based on the analysis; and a post modifying unit that modifies the post on the social networking website based on the generated post ranking.

In accordance with other aspects of this embodiment, wherein the activity of the users comprises at least one of user feedback associated with the post on the social networking website, a view count of the post on the social networking website, a view count of all posts by the user on the social networking website, and measured activity from another social networking website.

In accordance with further aspects of this embodiment, the post ranking unit generates the post ranking based on a weighted comparison of the activity of the users, and wherein the post modifying unit promotes the post on the social networking website based on the post ranking.

In accordance with other aspects of this embodiment, the system may further include a training image retrieving unit that retrieves a plurality of training images each associated with one of the digital image categories; a training image analysis unit that analyzes each of the training images to determine a second image feature; a training image comparing unit that compares the second image feature of each training image to a list of preset second image features; a category assigning unit that assigns a category to each training image based on the comparison; a category accuracy unit that determines an accuracy of the categories assigned; and a database updating unit that updates the prestored category database based on the determined accuracy.

In accordance with additional aspects of this embodiment, the training image comparing unit compares the second image feature to the list of preset second image features by mapping the second image feature of the training image to one of the preset second image features, determining a difference between the second image feature of the training image and the one of the preset second image features, and adding a new preset second image feature to the list based on the determined difference.

In accordance with additional aspects of this embodiment, the second image feature is a keypoint vector.

In accordance with further aspects of this embodiment, the analyzing of the first set of digital images is performed by the image processor implemented in a mobile client device or a backend server.

In accordance with other aspects of this embodiment, the first set of digital images is captured by a camera of the mobile client device, and wherein the mobile device is configured to modify the first set of digital images based on another input from the user via the mobile device prior to the analysis.

In accordance with additional aspects of this embodiment, the system may further include an image processing operation selecting unit that selects an image processing operation based on a previous user image processing operation selection; and an image processing unit that processes each selected digital image from the first set using the selected image processing operation, wherein the processing is performed prior to displaying each selected digital image from the first set.

In accordance with additional aspects of this embodiment, the digital images of the first set are a video clip, and wherein the selection of the image processing operation is further based on a frame rate of the video clip.

Another aspect of the present disclosure relates to a computer program product comprising a series of instructions executable on a computer, the computer program product performing a process for implementing a hybrid memory system; the computer program implementing the steps of: analyzing, using at least one image processor, the first set of digital images to extract first image features from each of the first set of digital images; accessing a user profile stored in a memory, wherein the user profile comprises a preset list of image features corresponding to a second set of digital images previously selected by a user; comparing the extracted first image features to the preset list of image features; ranking each digital image of the first set based on the comparison; selecting each digital image from the first set having a ranking that exceeds a threshold; assigning a category to each selected digital image based on a comparison of each selected digital image to a prestored category database of digital image categories; displaying each selected digital image with the assigned category on a display device; receiving an input from the user in response to the displaying of each selected digital image and the assigned category; updating the user profile and the category database in accordance with the input; and selecting at least one subsequent digital image from a third set of digital images based on the updated user profile and category database.

In another aspect, the present disclosure relates to a method for selecting a digital image comprising: receiving a first set of digital images; analyzing, using at least one image processor, the first set of digital images to extract first image features from each of the first set of digital images; accessing a user profile stored in a memory, wherein the user profile comprises a preset list of image features corresponding to a second set of digital images previously selected by a user; comparing the extracted first image features to the preset list of image features; ranking each digital image of the first set based on the comparison; selecting each digital image from the first set having a ranking that exceeds a threshold; assigning a category to each selected digital image based on a comparison of each selected digital image to a prestored category database of digital image categories; displaying each selected digital image with the assigned category on a display device; receiving an input from the user in response to the displaying of each selected digital image and the assigned category; updating the user profile and the category database in accordance with the input; and selecting at least one subsequent digital image from a third set of digital images based on the updated user profile and category database.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

DETAILED DESCRIPTION

The present disclosure relates to methods of selecting one or more images or video segments from an input video. The selected images or video segments may be chosen based on their likelihood of being aesthetically pleasing to a given user. The determination of how likely a candidate image or video segment is to be aesthetically pleasing to a given user may be based on an analysis of the inherent properties of the image or video segment (e.g., brightness or number of smiling faces), based on metadata associated with a given image or video segment (e.g., location where taken), based on input from the given user (e.g., similarity to previously accepted images or video segments), based on input from other users (e.g., similarities to images or video segments that are popular on social media websites), or any combination of these factors.

Selection of Images or Video Segments from within a Given Video

Figure 1:
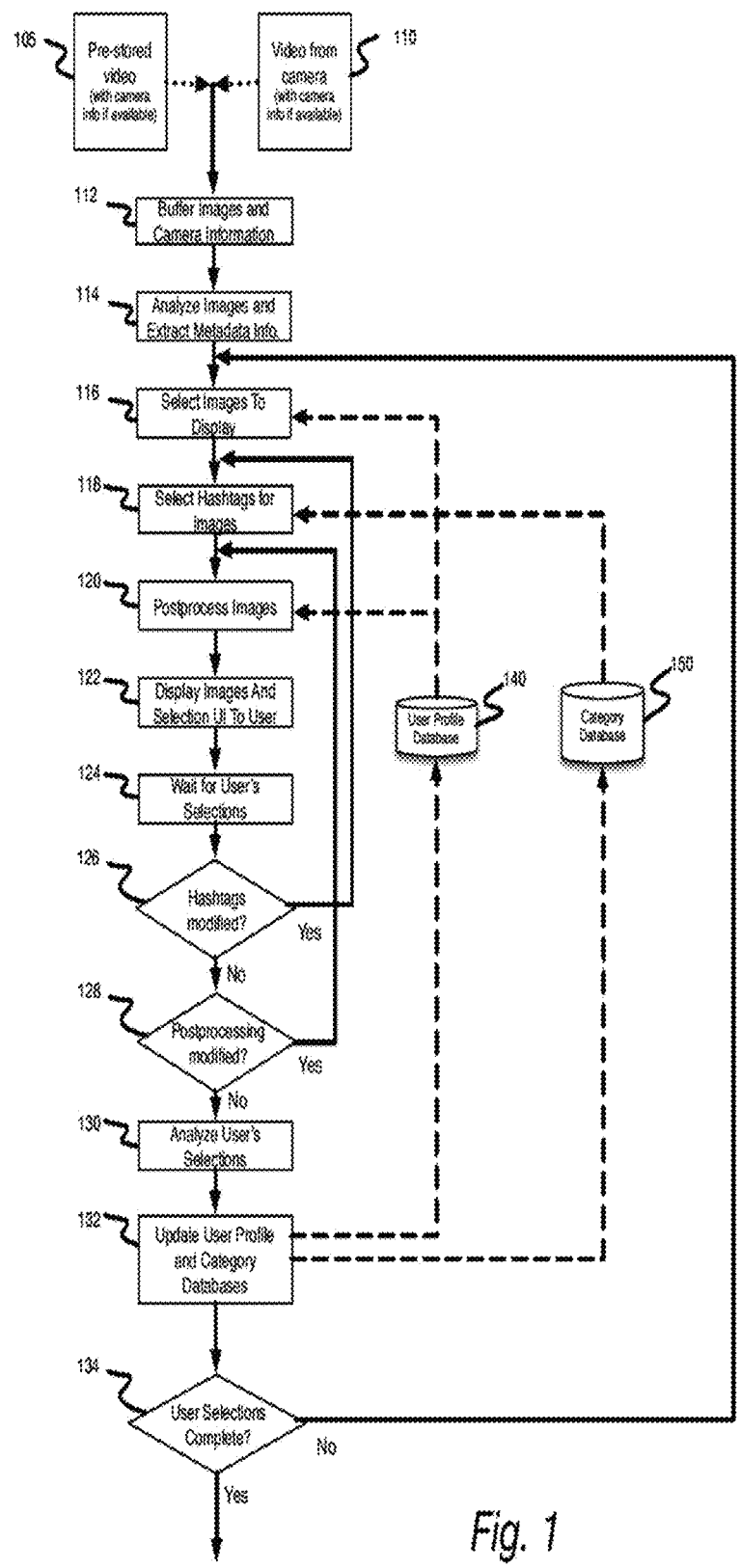
FIG. 1 is a flowchart illustrating a method of processing a video, in accordance with some embodiments of the present disclosure.

FIG. 1 is a flowchart illustrating a method of processing a video, in accordance with some embodiments of the present disclosure. The method includes steps for selecting images from within a given video for presentation to a user, selecting proposed hashtags for the images, and selecting post processing operations to be performed on the images when presented to the user. Although the below description is given with respect to images, similar techniques may be utilized to select video segments from a given video, in addition to or instead of images. The method may utilize feedback provided by the user from prior execution cycles of the method to improve the selection of individual images from a video. The method results in a group of images that is displayed to the user and from which the user then may choose one or more images to keep in a library or post to an Internet site. An image that is "kept" is stored in a file storage location that may be local on the user's device or on a storage medium external to the user's device for potential future use or viewing by the user. A posted image (also known as a "shared" image) may be uploaded to an external web-based service, such as a social media service like FACEBOOK, FLICKR or INSTAGRAM. Because the method may utilize user feedback indicating the features of previous images that were kept or posted, as well as the features of previous images that were rejected by the user, the method provides the advantage of displaying proposed images to a user that have many features known to be appealing to that user. Images selected in this way are likely to be more appealing images overall. Features of an image are described in more detail below and may include aesthetic features (such as the distribution of objects in the image; the "warmth" of colors in the image; conformance to the well-known "rule of thirds"), semantic features (such as facial and body detection and recognition; pose, smile and eye detection; categorization of objects in the image) and low-level features (such as indicators related to brightness, contrast, blur and color distribution; spectral measures such as frequency or wavelet transform coefficients; vectors known as "keypoints" that describe the corners of objects and their surrounding pixels).

In FIG. 1, an input video may be obtained from a pre-stored video source 105 or from a live camera 110 that provides video frames (images). An input video obtained from these or other sources may be then passed to processing step 112. In step 112, the input sequence of video images is buffered and made available to block 114 at a rate at which block 114 is capable of operating. For example, this rate may be different depending on the operating speeds (e.g., CPU clock rate) of the hardware implementing the method. Video sources 105 and 110 are not necessarily connected to each other, but instead, as indicated by the dotted line and arrowhead emanating from each of the video sources 105 and 110, one or the other is chosen as an input to step 112.

Video source 105 or 110 may also present camera information to processing step 112, if available. Camera information includes, for example, data from an accelerometer, gyroscope and/or GPS location sensor, wherein that data provides information about the motion and location of the camera at the instant one or more respective images were captured by the camera. Such information can be used, for example, to reject images for which the camera is known to be moving at a fast rate because those images are likely to be blurry and undesirable to the user.

Video source 105 or 110 may also present user interaction metadata comprising a record of user interaction with a touch screen display that displays/displayed the video as it is/was recorded by a camera device, e.g. when capturing video using a smart phone or tablet that has both a camera and a touch screen display. This record of user interaction metadata may be used as described further below.

In step 114, feature information (also referred to as "features" or "metadata") is extracted from each image. As described above, features may include aesthetic features (such as the type and distribution of objects in the image and conformance to the well-known "rule of thirds") and low-level features (such as indicators related to brightness, contrast, blur and color distribution). Features may also include whether the picture is taken indoors or outdoors, the type of background and lighting (e.g., blue sky and bright sunlight, a solid brown wall and diffuse indoor lighting) and the number of objects detected and their classifications, including identification of specific people from the image if possible. The extracted features for the images, and the images themselves, are then passed to step 116.

Inputs to step 116 may include the images themselves, features extracted from the images and camera information, as well as user profile information from database 140 related to preferences or dislikes of previous images with the same or similar features. (Dotted lines in the flowchart figures indicate flow of data as opposed to flow of processing steps. A query to the user profile database 140 to extract user profile information is not shown in FIG. 1 in order to simplify the diagram; only the return of information from database 140 to step 116 is shown.) Using feature information from the images, as well as a user preference profile related to the features of the current images, step 116 selects images from the sequence of images for display to the user in step 122. As an example of the selection process, step 116 may reject images with high blur or low brightness or low contrast. As another example, step 116 may select images with one or two people, both smiling, if previous user preferences indicate these are features of images the user has chosen to keep or upload in the past.

Once the images are selected in step 116, step 118 selects suggested hashtags (or any other type of categorization) for display to the user along with the respective images. The details of hashtag selection is described below. In step 120, images are post-processed using image post-processing operations. These operations may apply image processing algorithms to existing images to make those images more appealing to a viewer. Certain post-processing techniques may be known to those of ordinary skill in the art and may include color adjustment (e.g., increasing or decreasing color saturation), white balancing, sharpening or softening of the edges in the images, brightness and contrast adjustments, and/or application of filtering operations such as "Sepia tone." Step 120 may also use information from the user profile database 140 as an input. The choice of post processing operations to be applied to the selected images may be based on metadata extracted from the image and information about past user post-processing preferences, if available, for previous images with the same or similar metadata characteristics. For example, if a user has indicated a past preference for brightness enhancement of images taken indoors with limited brightness, then step 120 may apply a brightness enhancement to any images with metadata indicating that they were taken indoors with limited brightness.

Step 120 may apply post processing operations based on the user interaction metadata discussed above. In some embodiments, an area of an image that is outlined, double tapped, or interacted with by the user in some designated manner during recording may be designated an area of emphasis. Other techniques for collecting user input that are known to those of ordinary skill in the art may be also be used to specify areas or points of emphasis. Areas of emphasis may be used as a luminance or color reference when applying post-processing that brightens, darkens or white balances the image. Alternatively, areas of interest may be used to center and scale cropping and/or zooming post-processing operations.

After the images to be displayed are selected and post-processing enhancements are applied to the images, the selected images are displayed in step 122. These images may be displayed to a user in a format defined by a user interface of a viewing device. Typical viewing devices include mobile smartphones, tablet computers, wearable computing devices (e.g., wearable glasses devices such as GOOGLE GLASS), laptop computers, and desktop computers. Processing step 122 also provides User Interface selection tools, such as scrolling windows and selection buttons, for allowing the user to view the selected and displayed images in an organized manner and select images to be kept in a storage library and/or uploaded to a website or external storage location. Step 122 also displays suggested hashtags for displayed images, which the user may select or reject. The user may also add hashtags other than those resulting from step 118.

Processing step 124 waits for and then processes a user response to the displayed images and associated data. Step 124 may also proceed in the absence of a user response if a pre-determined amount of time elapses. A user response may indicate a change in post-processing selections, a change in hashtag selections, or a change in the user's choice of selected images for keeping in an image library and/or uploading to a website or an external storage location. In step 126, if the user response modifies hashtags, then processing goes back to step 118 and the results of the hashtag modification are displayed in 122 again. For example, if a user opens an editable text window to type in an original hashtag, then the display step 122 may show, along with the editable text window, a set of suggested hashtags based on auto-completing the text already typed into the text window. In step 128, if the user has modified post-processing selections for one or more images, then processing goes back to step 120 to redo the post-processing operations according to the user's modified selections and step 122 displays the modified images.

Once the user has completed his or her current selections, processing continues to step 130, in which both selected and rejected images and their metadata may be analyzed. As part of this analysis, a count of the selections and rejections that are made may be kept. For example, in some embodiments, a selection count and a rejection count may be stored for each of a plurality of metadata elements. For example, the rejection count of a given metadata element may be the number of previously displayed images with that metadata element that were rejected by the user. Similarly, the selection count of a given metadata element may be the number of previously displayed images with that metadata element that were selected by the user. For each metadata element associated with a rejected image, that metadata element's rejection count is incremented. For each metadata element associated with a selected image, that metadata element's selection count is incremented. Hashtag and/or category information may also be analyzed in step 130. In some embodiments, if a hashtag is selected or added with an image, the categories associated with that hashtag (hashtags to categories may have a one-to-one or one-to-many cross-reference mapping) have their selection count increased. If a proposed hashtag is not selected, then categories associated with that hashtag may have their rejection count increased.

In step 132, the user profile database 140 and/or category database 150 may be updated. In the example above, the selection count or rejection count for each metadata element may be incremented for each metadata element and each respective image that is displayed to the user in step 122. Likewise the selection count and/or rejection count for each category may be incremented for each proposed hashtag that is displayed to the user in step 122. Finally, in step 134, it is determined whether the user has finished selecting images. If not, the method returns to step 116 where further images may be selected for user review. If the user has completed his or her selections, then the method may terminate.

After the user profile database 140 is updated with the user's preferences, the updated data may be used by steps 116 and 120 for a next set of images to select and post-process according to a user's updated preferences. For example, if a metadata element "background" indicates whether the photo's primary background is one of gray sky, blue sky, landscape, or indoors, and the user typically rejects images with gray skies, then photos with a gray sky will increasingly show a greater rejection count, and new photos with gray skies are less likely to be selected in step 116 on a following iteration. Likewise, the updated user preferences stored in category database 150 may be used by step 118 for future images to propose hashtags according to a user's updated preferences. For example, if a hashtag "dog" is repeatedly proposed but never selected by a user, then the probability that that hashtag is proposed for future images will continually decrease until it is never or rarely proposed, even if object recognition techniques indicates that the main subject of the picture is a dog.

Figure 2:
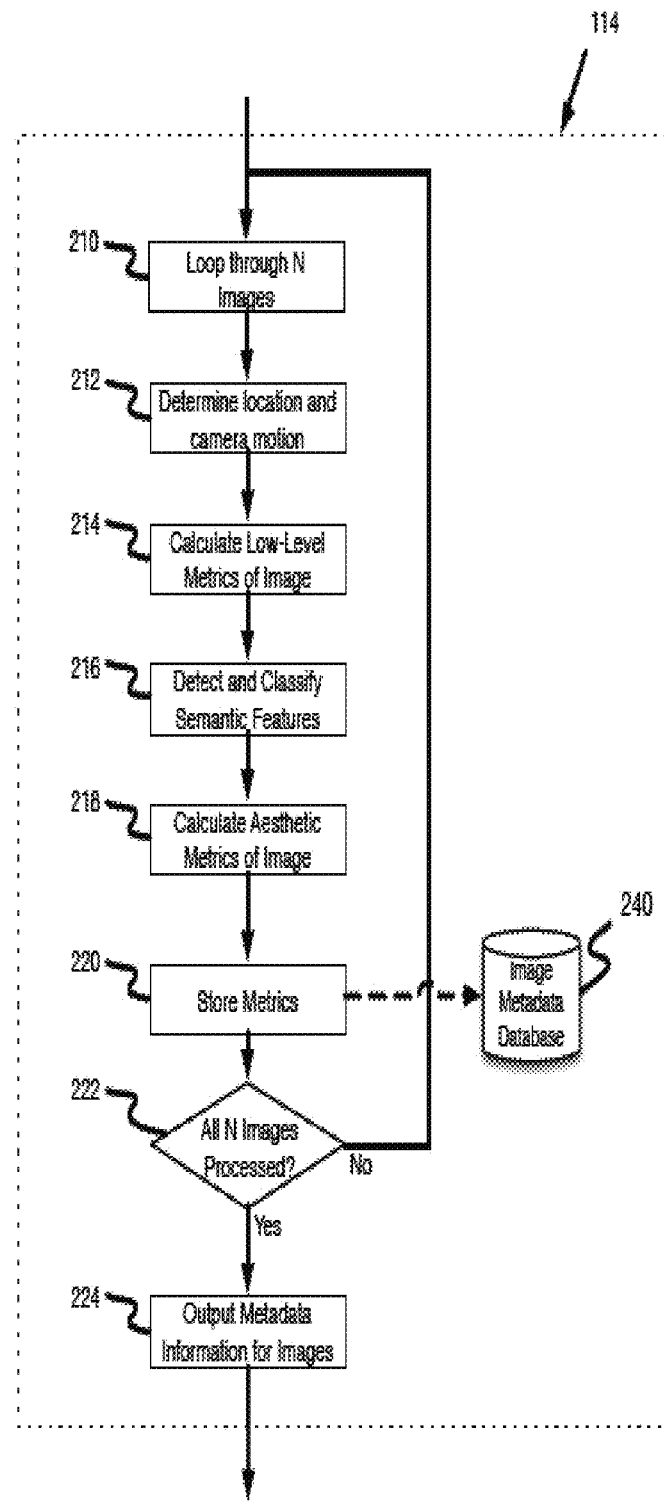
FIG. 2 is a flowchart illustrating a method of analyzing images and extracting associated metadata, in accordance with some embodiments of the present disclosure.

FIG. 2 is a flowchart illustrating a method of analyzing images and extracting associated metadata, in accordance with some embodiments of the present disclosure. For example, step 114 of FIG. 1, Analyze Images and Extract Metadata Information, may be implemented according to the method illustrated by FIG. 2. For each of a set of N input images (e.g., from a video), a processing loop is executed to extract metadata from an image. In some embodiments of the present disclosure, the metadata extraction processing loop includes a step 212 of determining location and camera motion, a step 214 of calculating low-level metrics of an image, a step 216 of detecting and classifying semantic features of an image, a step 218 of calculating the aesthetic metrics of an image, and a step 220 of storing the features and metrics of an image.

Step 212 analyzes the GPS coordinates associated with an image (e.g., as provided by step 112 of FIG. 1, described above) and uses this information as input to a location service to determine the location of the camera at the time the image was captured. Location information may be matched against locations known to be previously used for capturing video by the user, and a positive location match may be stored as a metadata element associated with the image. Step 212 may also analyze accelerometer and gyroscope data and may produce a motion vector and rotation vector of the camera at the time an image was captured. This data may also be stored as a metadata element or elements associated with that image.

Step 214 calculates the low-level metrics of an image, possibly including one or more indicators related to: brightness, contrast, blur; spectral measures such as frequency or wavelet transform coefficients; vectors known as "keypoints" that describe the corners of objects and their surrounding pixels. In addition to frequency and wavelet transforms, spectral metrics of an image may include any measure of color content including histograms of the red, green, blue (RGB) components or hue, saturation, brightness (HSV) components of the pixels within an image and/or subsections of an image, color distribution of colors throughout an image, or "warmth" of colors in an image. Keypoints may be found using one or more methods known to those of ordinary skill in the art (e.g., SIFT, SURF, BRISK) for finding distinctive object features such as corners. If the motion of the camera is significant, then a blur metric may be calculated as a simple function of camera motion (e.g., rather than taking on the processing burden of calculating blur by analyzing the image itself). If the camera is relatively still when capturing an image, blur may be calculated using an edge detection algorithm such as a Sobel filter or Canny edge detector that calculates a gradient metric for individual pixels, and then aggregates the gradients of individual pixels across an image to determine a single blur metric. Images with less blur are generally considered more appealing.

Step 214 may also generate a user interaction metric that indicates to what extent the user has made a gesture on a touch screen display during video recording that indicates a favorable or unfavorable opinion of the images recorded at that instant. The user interaction metric may be determined from the record of user interaction metadata described above. For example, a double tap motion or outline motion on a touch screen during recording may be a favorable gesture indicating a favorable opinion of images recorded at that instant, and a long swipe may be an unfavorable gesture indicating an unfavorable opinion of the images recorded at that instant. A favorable gesture may result in a user interaction metric that indicates higher appeal to the user and an unfavorable gesture may result in a user interaction metric that indicates lower appeal to the user. The user interaction metric may then be analyzed with other metadata in step 116 to decide which images to display in step 122.

Step 216 determines semantic level features of an image, which may include the results of detecting and classifying objects within an image, face detection and/or skin detection, and other classification methods known to those of ordinary skill in the art. Objects may be classified, for example, as one of a male face, female face, animal, building, pedestrian, or car. Faces may be analyzed for size, structure and location of facial features and matched against known faces from previously analyzed images to identify individuals in an image. Faces may also be analyzed to determine if eyes are open or closed and/or people are smiling or not.

Since step 216 may detect and classify objects and their locations, it may also utilize the record of user interaction described above to associate gestures on a touch screen display during camera recording with objects in the video. For example, one or more detected objects may each have an associated user interaction metric that indicates if the user made a favorable or unfavorable gesture on specific objects during recording. If a detected object is associated with one or more categories, and also has an associated user interaction metric, then the respective categories may have their category metrics, e.g. selection and/or rejection counts, modified according to the associated user interaction metric, possibly independently of the user's selection of images as a whole. For example, if an object in an image is determined in step 216 to be a dog, and the user tapped on or made a circular gesture or outline-like gesture around the object during recording, then the selection count of the category dog may be increased in step 132 independently of the selection of images by the user in step 124. Alternatively, an object may be recognized even if its type cannot be determined. For example, a dog appearing in an image may be recognized as a brown shape present in an image, even if that shape is not specifically identified as a dog. The shape or similar shapes can then be recognized again or tracked in subsequent images or frames. The amount of increase in selection count may be a function of the amount of favorable gesture interaction with the object, such that favorable gesture interaction by the user results in a substantially higher likelihood the whole image will be selected for display in step 116. The selection count for the respective categories may be increased permanently, or only for the duration of the current video, or for some duration thereafter applied to future videos. The determinations of step 216 may be passed on to step 218 for further processing.

Step 218 calculates aesthetic metrics of an image, which may include an analysis of the overall composition of objects within an image and their location and distribution throughout the area of an image. One known aesthetic metric is conformance to the "rule of thirds." The "rule of thirds" states that if an image is divided into nine equal parts by two horizontal lines and two vertical lines, then the main compositional objects in a photographic image should be located near at least one of these lines, and possibly near the intersection of two lines. A rule of thirds metric may be determined by comparing the location of the centroid and outer edges of detected objects relative to the lines that divide the image horizontally and vertically into thirds. In step 218, human faces may be analyzed to determine, for example, if the faces in the image are smiling or not, if subjects' eyes are open or not, and/or if faces are blurry or sharp.

The calculated features and metrics are stored during step 220. Once step 222 determines that all images are completed, the flowchart proceeds to step 224 where the calculated metadata is made available for each image. In some embodiments, the calculated features and metrics may be provided as the output of block 114 of FIG. 1.

Figure 3:
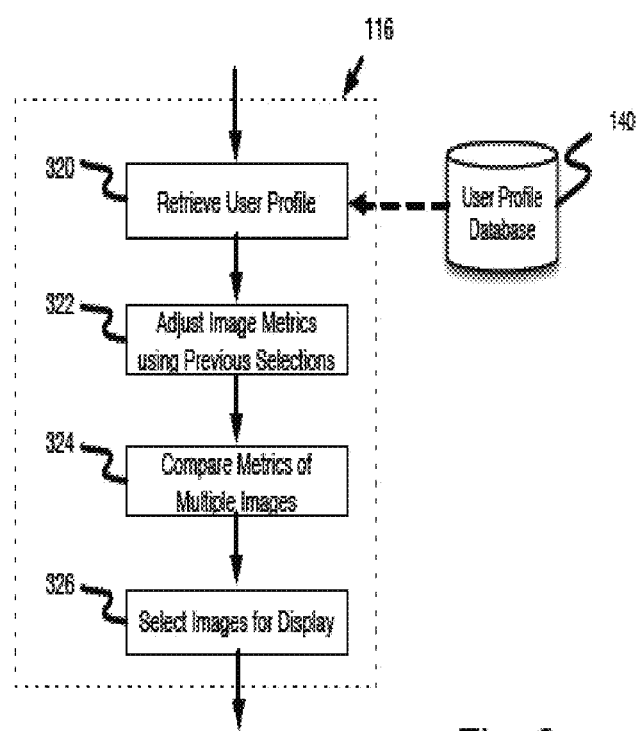
FIG. 3 is a flowchart illustrating a method of selecting images to display, in accordance with some embodiments of the present disclosure.

FIG. 3 is a flowchart illustrating a method of selecting images to display, in accordance with some embodiments of the present disclosure. For example, step 116 of FIG. 1, Select Images to Display, may be implemented according to the method illustrated by FIG. 3. Features for the images to process are passed into step 320, which retrieves user profile information from the user profile database 130 indicating user preferences and dislikes for previous photos with similar features. In step 322, those features which most differentiate previous images the user has kept versus previous images the user has rejected may be determined and the respective features from 320 weighted such that the most discriminating features weigh more strongly in the calculation of a single quality metric or vector of quality metrics that is output to step 324. In step 324, the metrics chosen in step 322 are compared for the set of images under consideration and the images are rank ordered from most appealing to least appealing. Step 326 then chooses some number of images from the rank ordering, starting with most appealing, according to rules provided by a higher level control module (not shown) of the application that is displaying the images to a user.

Figure 4:
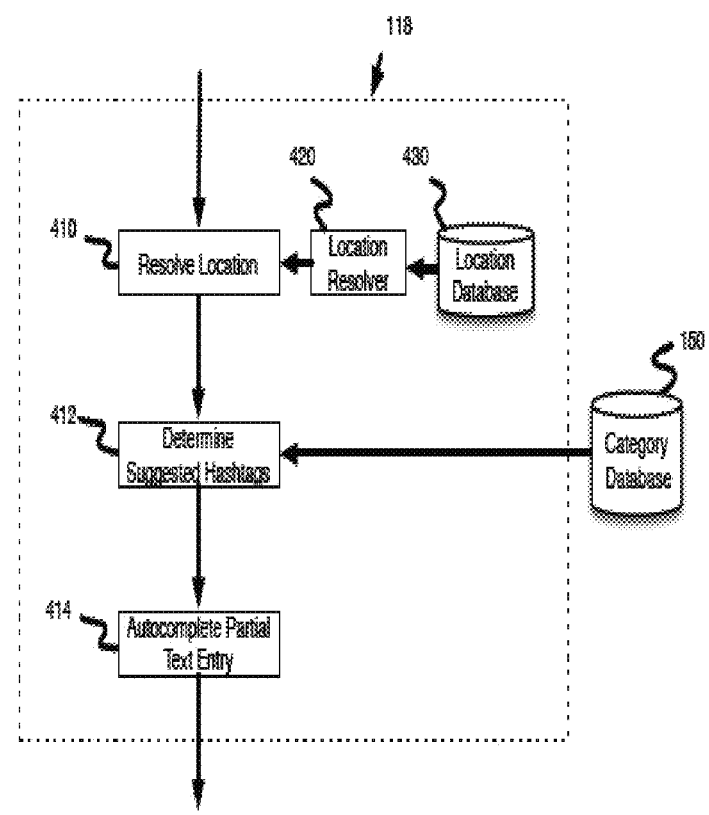
FIG. 4 is a flowchart illustrating a method of categorizing images, in accordance with some embodiments of the present disclosure.

FIG. 4 is a flowchart illustrating a method of categorizing images, in accordance with some embodiments of the present disclosure. For example, step 118 of FIG. 1, Select Hashtags for Images, may be implemented according to the method illustrated by FIG. 4. Step 410 resolves the location in which the image was captured by querying a location resolver service 420 and location database 430, possibly from an external service such as GOOGLE PLACES, and passes this information to step 412. Step 412 queries a category database 150 using features associated with the image (e.g., the features determined in step 114 of FIG. 1) and the location information determined in step 410. For example, if a dog is detected in an image then the category database is queried for "dog," and if the location information is Pioneer Square in Seattle, then the categories "Pioneer Square" and "Seattle" may be queried as well. The features used possibly include a set of quantized keypoints that describe in detail prominent features of an image such as object corners and pixels in the regions surrounding them. These keypoints and other features of an image may be combined to generate an image "fingerprint" vector, and this fingerprint vector may be compared to fingerprint vectors representative of a plurality of categories. In some embodiments, machine learning methods such as Maximum Entropy, Naive Bayes or Support Vector Machines may be used to perform the comparisons. If an image fingerprint is close enough to a category fingerprint, or closer than one such fingerprint than to other category fingerprints, then the image is determined may be matched to the category and respective hashtags are suggested to the user.

The Category Database 150 may be trained with a plurality of hashtag suggestions using a large sample of images and respective hashtags retrieved from sites on the Internet, and also using the user's prior hashtag selections. For example, if queried with "Seattle" because the location of image capture is known to be Seattle, then the database may return 'emeraldcity' and 'seahawks' in addition to 'seattle' as the most likely hashtags a user will select.

In step 414, the user may be typing the letters of a new hashtag into an editable text field (e.g., if step 118 of FIG. 1 is being executed as a loopback from step 126 of FIG. 1). In this case, the completed letters of the text field may be sent to database 150 and complete hashtag suggestions may be returned. For example, a text field that contains "sky" may result in the hashtags "sky," "skyline," and "skyscraper," being returned as possible completions. Step 414 selects the autocomplete possibilities to be displayed as a user types and presents them for display to the user (e.g., in 122 of FIG. 1). Such autocomplete possibilities are typically presented just above or below the editable text window in which the user is currently typing.

Training to Determine and Rank Order Categories and Hashtags

In order to detect objects and categories within an image that has not yet been processed, an algorithm may have previously been "trained" using a set of training images, each of which is known (with certainty or high probability) to include or not to include one or more categories from a set of categories (a "dictionary") that the algorithm uses when analyzing potential category matches. The dictionary is implementation dependent and is typically tailored to what is most useful to the end user of a computer application using the algorithm. (For example, in one application the goal may be to detect dogs, cats and chickens; in another application it may be to detect cars, trucks and motorcycles.) The dictionary also typically evolves as training and usage proceed, adapting to new training images and user feedback regarding actual categories provided with images or chosen for images.

Figure 5:
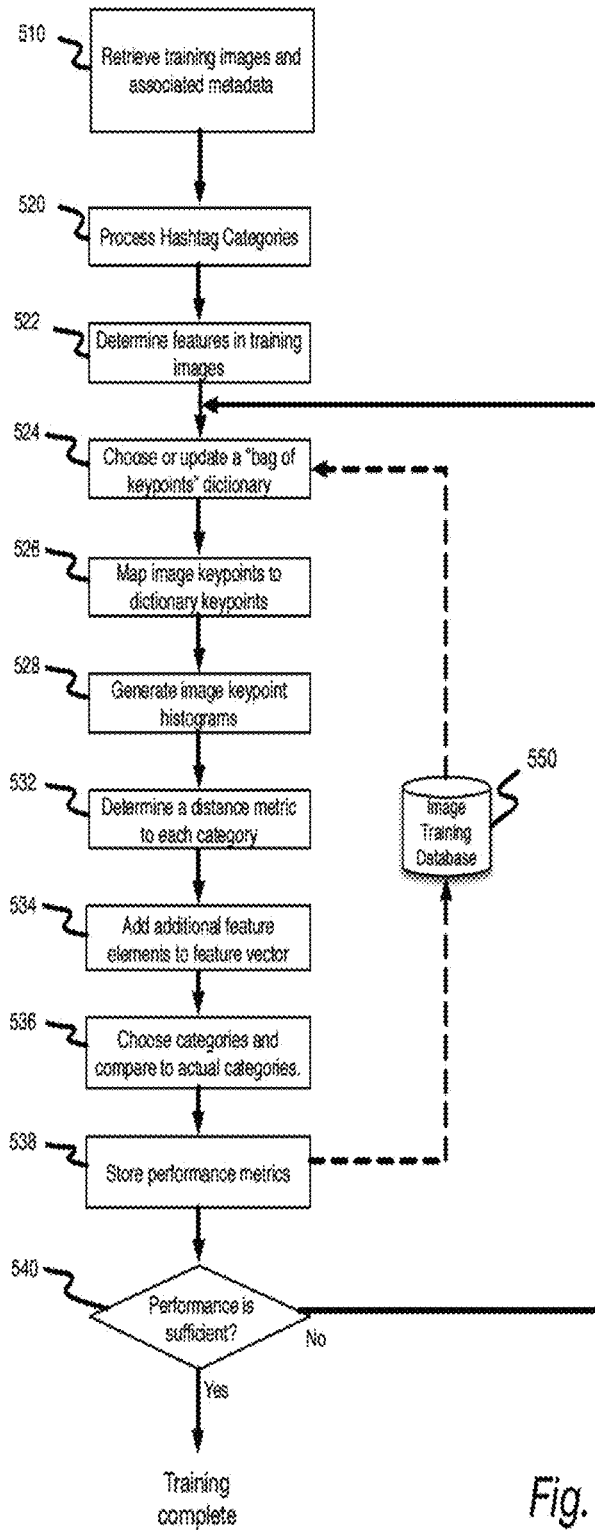
FIG. 5 is a flowchart illustrating a method of training an object and/or categorization system, in accordance with some embodiments of the present disclosure.

FIG. 5 is a flowchart illustrating a method of training an object and/or categorization system, in accordance with some embodiments of the present disclosure. In step 510, a set of training images, possibly including many thousands of different images, is made available to the algorithm. These training images may be retrieved from either a local or remote image storage area or from a web-based photo service such as INSTAGRAM or FLICKR. Each such image may be made available along with its metadata to the algorithm. This metadata may include a user name of the user who posted the image, an original comment, any hashtags associated with the image, and possibly one or more additional comments about an image and the user name of the person who posted each comment. The training images may include images previously stored or posted by the same user who is the originator of new images that are to be categorized once training is complete. In step 520, hashtags or other categories associated with the training images are normalized and ranked so that they can be more easily compared to the hashtags or categories of other images. As part of this process, a category dictionary of possible image categories (e.g., hashtags) may be established or updated.

Processing step 522 determines features and metadata of the training images. In some embodiments, these features and metadata may be determined using similar steps to those described for step 114 of FIG. 1. The term "feature" again refers to any metric or characterization point used to analyze an image, and may include metrics such as sharpness, blur, color, brightness or contrast, as well as localized, discriminating patterns such as "keypoints". In some embodiments, a keypoint can be a pattern of interest found in a localized area of an image and is represented as a vector, possibly containing hundreds or more of elements and dimensions. For example, a keypoint might be determined for a 16×16 pixel array that is detected to very likely contain the corner of some object, based on the values of the 256 pixels in the 16×16 array as well as how much they change in different directions throughout the 16×16 array (e.g., as represented by gradient vectors). In some cases, the resulting keypoint vector elements may represent combinations of vector gradients that prove via training to distinguish two or more categories effectively.

In order to constrain the training task to a more manageable number of possibilities and dimensions when determining threshold rules, step 524 retrieves and/or updates the current "bag of keypoints" dictionary (which, for clarity, is different than the category dictionary). This keypoint dictionary is retrieved from the image training database 550 and may be updated based on clusters of keypoints found in current training images, which may be grouped into new dictionary elements representing, for example, the centroids of the respective clusters. The keypoint dictionary provides a limited set of vectors to analyze and match, although the number of keypoints in a dictionary may still be in the thousands or millions.

In step 526, keypoints are mapped to their closest respective dictionary keypoints. For training purposes, the distances between original keypoints and respective dictionary keypoints may be stored and analyzed later to determine if additional keypoints are to be added to the dictionary on future iterations of the training algorithm.

Step 528 generates a histogram of dictionary keypoints found in each training image. This histogram is then compared in step 532 to one or more representative histograms for each category in a category dictionary (e.g., as established in step 520), and a vector metric is generated to determine the match of a training image keypoint histogram to all the category histograms. In some embodiments, an "earth mover" distance is used, representing the total number of normalized counts to move, in increments of one bin left or right, in order to make one histogram match another.

In step 534, additional features besides the "bag of keypoint" features calculated in step 522 may be added to the vector metric generated in step 532 to generate a "fingerprint" of a training image. Examples of additional features are sharpness, blur, color, brightness or contrast metrics. The fingerprint is compared with fingerprints representative of each category and the resulting comparisons are passed to step 536. In step 536, the fingerprint comparisons may be used to determine if an image does or does not match each category of interest. Since training images have known categories associated with them prior to training, this is a test of the accuracy of the training algorithm. The fingerprint comparison test may look for fingerprint vector elements that are the most discriminating in distinguishing two or more categories and adapts threshold tests to weigh discriminating elements more heavily than other elements, or to ignore less discriminating elements for a given category test. Therefore, in training to determine if a particular image does or does not contain a particular category, the training algorithm uses the sets of keypoints and other features associated with images that do not contain that category, as well as the sets of keypoints and features associated with images that do contain that category, and attempts to determine threshold rules based on a vector distance measures that accurately enable new image classification. The threshold rules may analyze fingerprint elements in isolation (e.g. naive Bayes) or analyze multiple categories in conjunction with each other. The output of step 536 is a set of metrics indicating the accuracy of the algorithm given the training performed so far. For each category, a metric may be generated for the percentage of instances the category is correctly identified in an image versus not, and the percentage of time it is incorrectly identified (i.e. a "false alarm") versus not. In step 538 the resulting vectors are stored in training database 550.

In step 540, it is determined if the precision and recall metrics are sufficient for all categories. If the precision and recall metrics are sufficient, the training is complete and the algorithm is ready to classify new, not-yet-seen images. If not, then the algorithm may loop back to step 524 to iterate on a set of modified keypoints and feature dimensions that may better discriminate categories that are not detected correctly or have too many false alarms. Alternatively the algorithm may retrieve additional training images (e.g., as described for step 510). To reduce the likelihood that the algorithm prescribes inaccurate categories, the training may comprises iterative cycles of optimization to attempt to improve overall decision making. These iterative cycles typically include adjusting threshold metrics, decision planes and possibly keypoint dictionary, testing each adjustment or set of adjustments to determine if decision making improved or regressed. These iterative cycles may continue until satisfactory results are obtained with the algorithm on the given training set.

Figure 6:
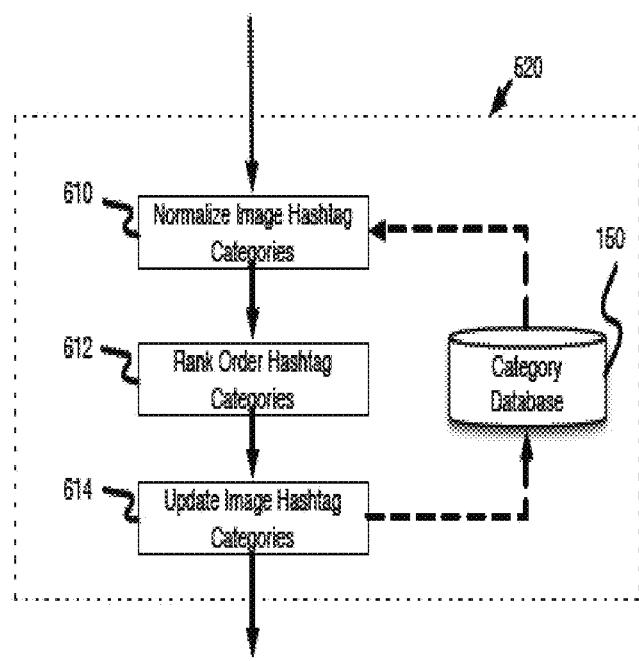
FIG. 6 is a flowchart illustrating a method of processing image categories, in accordance with some embodiments of the present disclosure.

FIG. 6 is a flowchart illustrating a method of processing image categories, in accordance with some embodiments of the present disclosure. For example, step 520 of FIG. 5, Process Hashtag Categories, may be implemented according to the method illustrated by FIG. 6. This method may also be applied more generally when selecting images or video segments from an input video. Image categories may be normalized in step 610 to remove variations that the user does may not care about distinguishing. For example, the categories "dog," "dogs," "doggie," and "doggies" may be simply grouped as "dog." Even distinct breeds of dog might be grouped into the one category "dog" if the algorithm is not trying to distinguish individual breeds of dog, or they may be kept as separate categories if the goal is to distinguish by breed. Step 610 has access to the category database 150 which makes available information about existing categories and their ranking in terms of popularity and importance, as well as the mappings to use when normalizing hashtags. Step 610 produces a set of "normalized" categories.

Step 612 may use information passed from 610 including the category database information to update a histogram of the normalized hashtag categories, rank ordering them from most popular to least popular and taking into account new training images. The weighting that each instance of a hashtag has in the summation of total hashtag counts may be modified by the "importance" of the user who posted the image that contributed a respective hashtag, so that an image and hashtag posted by a known expert, or by the user for which the algorithm is being trained to process future images, will have greater weight than an image and hashtag posted by an unknown entity (e.g., an anonymous or new user).

Step 614 may store updated hashtag information back to the category database 150 and determines via a cutoff point which categories are included in the training dictionary. A given number of normalized categories above the cutoff point in terms of ranking become the dictionary for the training algorithm.

Ranking of Images Posted to Social Media Websites

Figure 7:
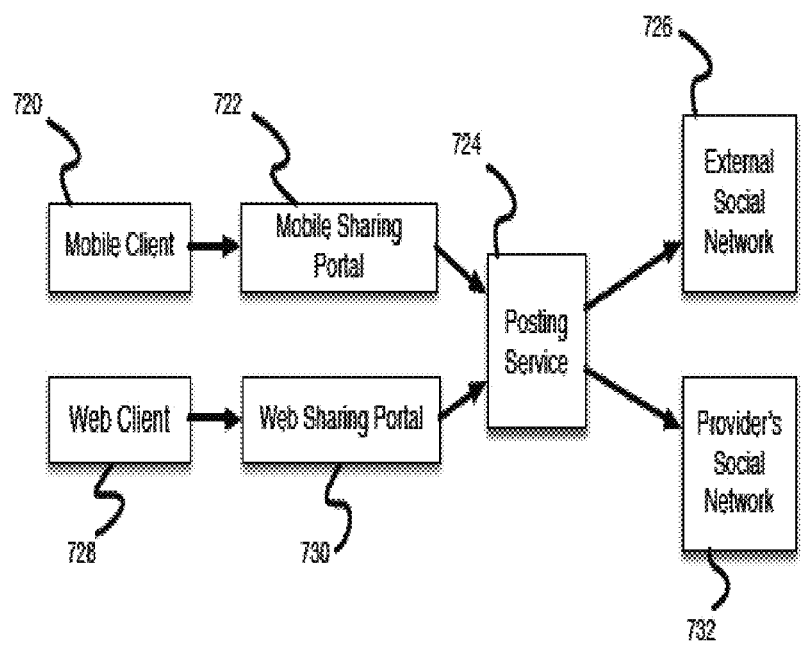
FIG. 7 is a system diagram illustrating a system for collecting and distributing image or video content and related metadata, in accordance with some embodiments of the present disclosure.

FIG. 7 is a system diagram illustrating a system for collecting and distributing image or video contents and related metadata, in accordance with some embodiments of the present disclosure. FIG. 7 includes posting service 724 that collects images and metadata from two sources, a mobile client 720 such as an application on a smartphone or wearable computing device, the posting performed via mobile sharing portal 722, and/or a web client 728 such as an internet browser on a computing device, the posting performed via web sharing portal 730. Posting service 724 may also connect images and/or metadata from a different number or type of sources. The posts may be augmented with supplemental metadata (e.g., using the process illustrated in FIG. 6) to classify and add hashtags to posted images, and/or using geolocation services to refine location information in the image. The posts of images and metadata may be queued and, as the queue is processed, re-posted to one or more external social networks such as FACEBOOK, TWITTER and INSTAGRAM represented by block 726 and/or are posted to a social network 732 maintained by the provider of posting service 724. The posting service 724 may also provide images and/or metadata to any other number or type of services. Posting service 724 may also query the social networks 726 and 732 to confirm the re-posts are complete, and for those posts that do not complete in a specified time, posting service 724 may then attempt to re-post until a confirmation is received. From a user standpoint, users of the mobile client 720 or web client 728 post images and video clips with metadata to social sites, and other users on other web or mobile clients may then access the social networks 726 and 732 and view, comment and select or reject the images and video clips; they may also upload, download and share images and video clips. Images and video clips may be posted to associated "channels" and selection counts may be associated with one or more channels to which videos are posted. Interactions related to posted images and video clips may involve users worldwide, many of whom are not associated with or known by the posting service 724.

Figure 8:
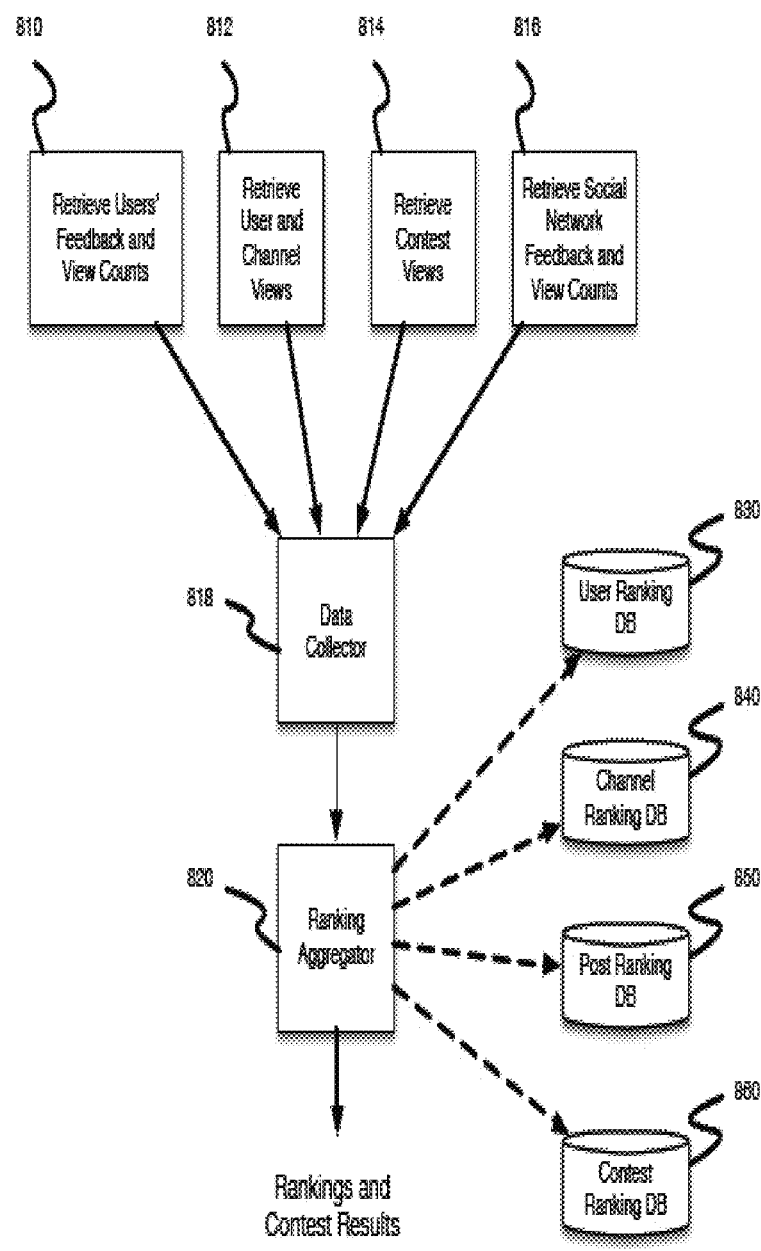
FIG. 8 is a flow diagram illustrating a system for collecting and analyzing data related to image or video data, in accordance with some embodiments of the present disclosure.

FIG. 8 is a flow diagram illustrating a system for collecting and analyzing data related to image or video data, in accordance with some embodiments of the present disclosure. In FIG. 8, data collector 818 may retrieve activity metrics from social networks (e.g., elements 726 and 732 of FIG. 7) associated with posts that were made by a posting service (e.g., element 724 of FIG. 7). Data collector 818 collects available activity metrics (which may depend on the specific social network) on a regular schedule and generates rankings from the activity metrics, with higher activity metrics mapping to higher rankings From the provider's social network (e.g., element 732 of FIG. 7), retrieved activity metrics may include user feedback and view counts collected by step 810, views associated with specific users and channels collected by step 812, and the number of views associated with a specific contest collected by step 814. Step 816 collects available activity metrics from external social networks. A ranking aggregator 820 updates databases related to user rankings 830, channel rankings 840, ranking of individual posted images and video clips 850 and rankings for specific contests 860. The ranking aggregator operation may be performed by servers in one or more hosted computing facilities (i.e. "in the cloud") using a well-known map/reduce process that takes the available data and forms weighted aggregations defined by provider's algorithm and based on contest rules and relative importance of data inputs 810, 812, 814 and 816. Other processes for processing the data known to those of ordinary skill in the art may also be used.

Results from the ranking aggregator 820 may be used to promote individual posts and users within a particular channel. For example, posts with higher rank may be shown higher in a list of available videos within that channel when a user views a list of posts for the channel. Users with higher ranks overall may have their posts promoted in each of the respective channels in which they reside.

Contests Based on Rankings

Contests may be created and arbitrated by a provider in order to generate user activity on a provider's social network (e.g., element 732 of FIG. 7). A simple contest might be "photo of the day" for the highest ranking photo posted on a given day, but many other contests with more complex rules are possible. For example, a contest may require a collection of three different photos of three different things in three different channels, such as a photo of food, a photo of a pet, and a photo of "something that made you happy that day." Others contests may request images or video clips, for example, from a particular game, concert, event, or bar in a local area. Contests can be time based and each contest can have its own time window for which it is open for posts. For example, a monthly contest may be held with a time window of each calendar month or each past rolling 30 days, and a "leader board" is actively maintained listing the top 10 users who have received the most positive activity and feedback from their posts on all channels including external social networks. Alternatively, to discourage posting of large amounts of low-quality images or video clips, rankings may be based on the one posting from each user that receives the most positive activity and feedback. Results may be maintained by the Ranking Aggregator 820. Individual users of provider's social network may have higher voting privileges than others or may earn voting privileges based on the rankings of their respective posts; the ranking service takes individual users' ranks into account by reading user ranking database 830.

Contest prizes may be "social points" on the provider's social network, but may also be tied to awards on other social networks or to coupons, merchandise or services from third-party merchants.

Improved Video Quality Based on User Interaction with a Camera During Recording

Figure 9:
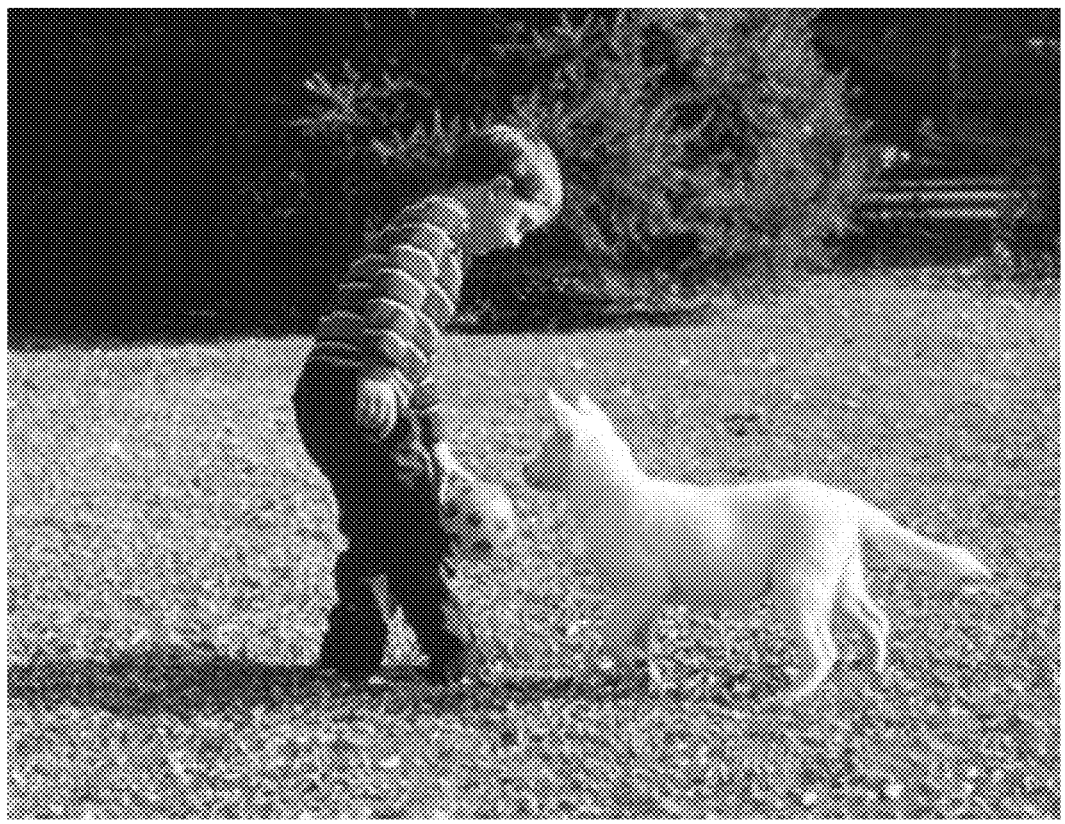
FIGS. 9-11 illustrate possible touch-screen interaction with a frame, in accordance with some embodiments of the present disclosure.
Figure 10:
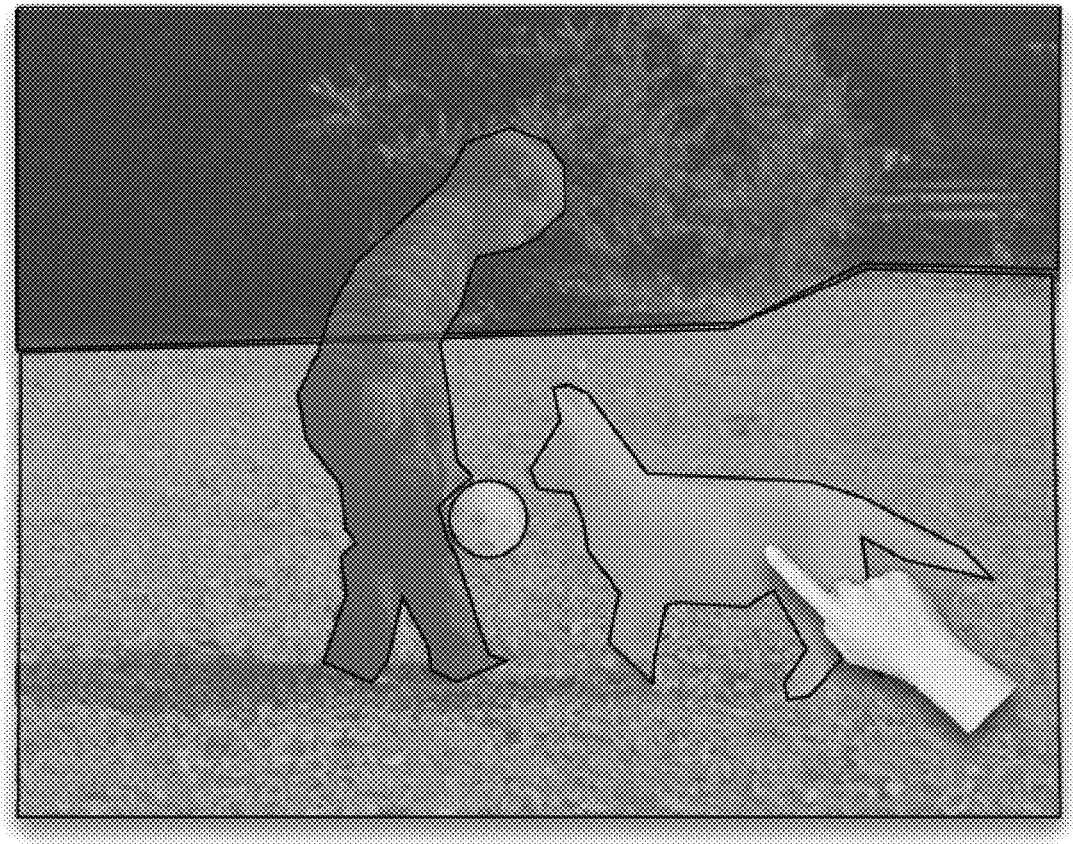
Figure 11:
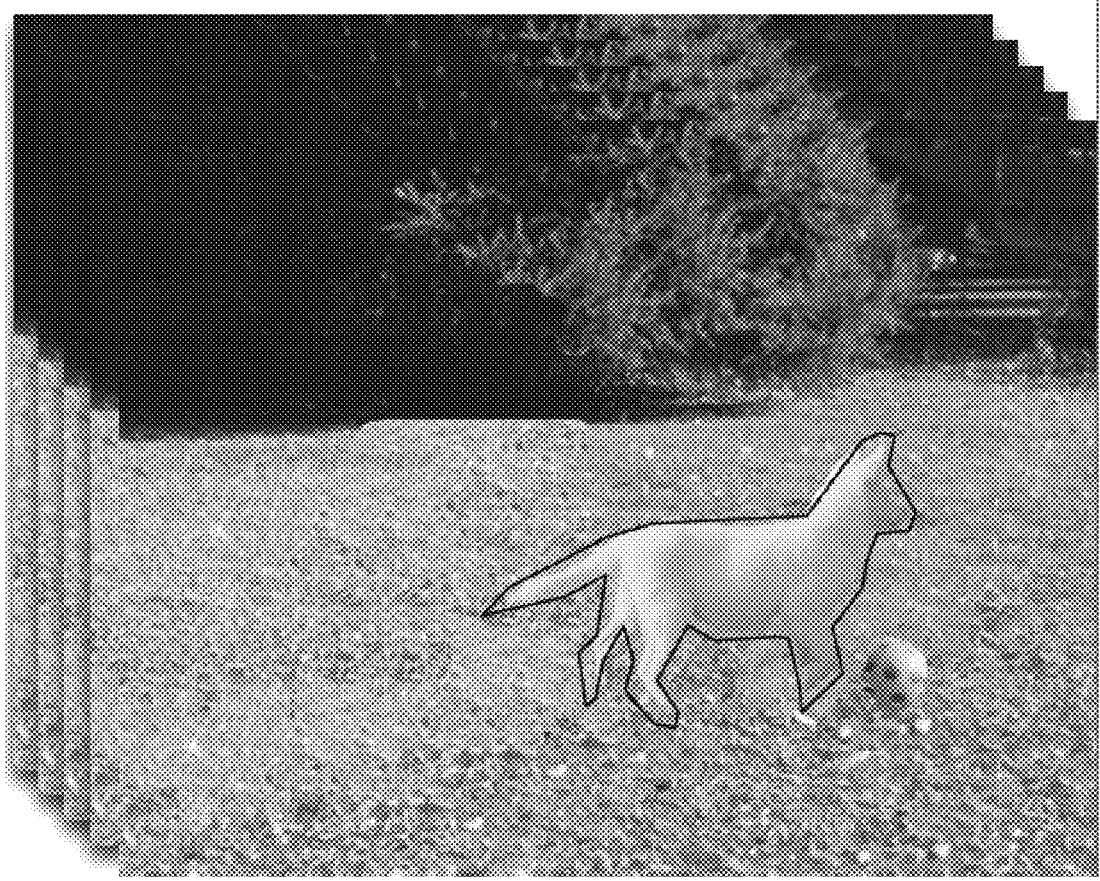

A camera device that is capturing video may modify its operation based on user interaction with the camera device during recording, such interaction including gestures made on a touch screen display that displays the video at the time of capture. This modified operation may result in changes to images recorded after the time of interaction. A gesture such as a tap, double tap or finger movement in a specified pattern that occurs in an area of an image during recording may indicate that the user wishes to emphasize that area of the video in later captured images within that video. For example, FIG. 9 illustrates a potential image that includes a child and a dog. FIG. 10 illustrates potential segments of the image that may be of interest to a user (in this example, the segments include the regions of the image that include the child and the dog). This segmenting may be invisible to a user. FIG. 10 also illustrates a tapping gesture applied to a region of the image corresponding to the dog. FIG. 11 illustrates that the dog, having been selected by the user, may be favored in other images that also contain the dog. As noted earlier, the dog may be recognized simply as a region of an image having a particular shape and/or color, and may not necessarily be identified specifically as a dog. Any of these gestures or other gestures may be used to indicate and perform one or more of the following operations: adjusting the camera focus such that the indicated part of the image is the part that is most in-focus; adjusting the camera exposure, brightness, white balance, etc. to enhance the indicated part of the image and/or its surrounding environment and lighting; zooming in or out such that the indicated part of the image fills a desired ratio of the entire image.

Other camera inputs may also be used to adjust camera operation. For example, captured audio may be processed to detect instructions from the user similarly to the way gestures on the touch screen display are processed to detect instructions from the user. Specific words or phrases detected within the audio input and determined to have come from the user may indicate any of the operations discussed above related to focus, exposure adjustment, zoom, etc. Other techniques for collecting user input or detecting user intent on a device with a camera that are known to those of ordinary skill in the art may also be used to obtain instructions from the user.

Implementation Hardware

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor may receive instructions and data from a read only memory or a random access memory or both. The essential elements of a computer are a processor for executing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those of ordinary skill in the art will appreciate that the conception, upon which this disclosure is based, may readily be utilized as a basis for the designing of other structures, methods, and systems for carrying out the several purposes of the disclosed subject matter. Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

What is claimed is:

1. An apparatus for selecting a digital image, the apparatus comprising:
   one or more computer processors; and
   a non-transitory computer-readable storage medium comprising instructions, that when executed, control the one or more computer processors to be configured for:
      receiving a first set of digital images;
      analyzing the first set of digital images to extract first image features from each of the first set of digital images;
      accessing a user profile stored in a memory, wherein the user profile comprises a preset list of image features corresponding to a second set of digital images previously selected by a user;
      comparing the extracted first image features to the preset list of image features;
      ranking each digital image of the first set based on the comparing of the extracted first image features to the preset list of image features;
      selecting each digital image from the first set having a ranking that exceeds a threshold;
      assigning a category to each selected digital image based on a comparison of each selected digital image to a prestored category database of digital image categories;
      displaying each selected digital image with the assigned category;
      receiving an input from the user in response to the displaying of each selected digital image and the assigned category;
      updating the user profile and the category database in accordance with the input; and
      selecting at least one subsequent digital image from a third set of digital images based on the updated user profile and category database.

2. The apparatus of claim 1, wherein ranking of each digital image comprises ranking each digital image of the first set based further on camera information of a camera that captured the first set of digital images.

3. The apparatus of claim 1, wherein the digital images of the first set are still digital images or digital images within a video clip.

4. The apparatus of claim 1, wherein receiving the first set of digital images comprises receiving the first set of digital images directly from a camera, from another memory in a pre-stored format, or from a website, and wherein the first set of digital images are associated with one of a plurality of users.

5. The apparatus system of claim 1, further configured for:
calculating an image metric for each digital image, wherein the image metric includes at least one of brightness, contrast, blur, and spectral measurements;
identifying objects in each digital image;
classifying the identified objects in each digital image; and
determining a distribution and location of the identified objects in each digital image,
wherein the comparing of the extracted first image features to the preset list of image features is based on the calculated image metric, the identified objects, the object classification, and the determined distribution and location of the identified objects.

6. The apparatus of claim 1, wherein the user profile stores an indication of whether the user liked or disliked each digital image of the second set of digital images.

7. The apparatus of claim 1, wherein selecting each digital image from the first set comprises selecting each digital image from the first set based further on feedback from other users on the second set of digital images previously selected by the user.

8. The apparatus of claim 1, further configured for:
posting one of the selected digital images from the first set or the second set to a website based on the user input.

9. The system of claim 8, further configured for:
analyzing activity of users on the website, wherein the website is a social networking website;
generating a post ranking of specific activity on the website based on the analysis; and
modifying the post on the social networking website based on the generated post ranking.

10. The apparatus of claim 9, wherein the activity of the users comprises at least one of user feedback associated with the post on the social networking website, a view count of the post on the social networking website, a view count of all posts by the user on the social networking website, and measured activity from another social networking website.

11. The apparatus of claim 10, wherein generating the post ranking comprises generating the post ranking based on a weighted comparison of the activity of the users, and wherein modifying the post comprises promoting the post on the social networking website based on the post ranking.

12. The apparatus of claim 1, further configured for:
retrieving a plurality of training images each associated with one of the digital image categories;
analyzing each of the training images to determine a second image feature;
comparing the second image feature of each training image to a list of preset second image features;
assigning a category to each training image based on the comparison;
determining an accuracy of the categories assigned; and
updating the prestored category database based on the determined accuracy.

13. The apparatus of claim 12, wherein comparing the second image feature to the list of preset second image features comprises mapping the second image feature of the training image to one of the preset second image features, determining a difference between the second image feature of the training image and the one of the preset second image features, and adding a new preset second image feature to the list based on the determined difference.

14. The apparatus of claim 12, wherein the second image feature is a keypoint vector.

15. The apparatus of claim 1, wherein the analyzing of the first set of digital images is performed by an image processor implemented in a mobile client device or a backend server.

16. The apparatus of claim 15, wherein the first set of digital images is captured by a camera of the mobile client device, and wherein the mobile device is configured to modify the first set of digital images based on another input from the user via the mobile device prior to the analysis.

17. The apparatus of claim 1, further configured for:
selecting an image processing operation based on a previous user image processing operation selection; and
processing each selected digital image from the first set using the selected image processing operation, wherein the processing is performed prior to displaying each selected digital image from the first set.

18. The apparatus of claim 17, wherein the digital images of the first set are a video clip, and wherein the selecting of the image processing operation is further based on a frame rate of the video clip.

19. A non-transitory computer program product comprising a series of instructions executable on a computer, the non-transitory computer program product performing a process for selecting a digital image; the computer program implementing the steps of:
receiving a first set of digital images;
analyzing the first set of digital images to extract first image features from each of the first set of digital images;
accessing a user profile stored in a memory, wherein the user profile comprises a preset list of image features corresponding to a second set of digital images previously selected by a user;
comparing the extracted first image features to the preset list of image features;
ranking each digital image of the first set based on the comparison;
selecting each digital image from the first set having a ranking that exceeds a threshold;
assigning a category to each selected digital image based on a comparison of each selected digital image to a prestored category database of digital image categories;
displaying each selected digital image with the assigned category on a display device;
receiving an input from the user in response to the displaying of each selected digital image and the assigned category;
updating the user profile and the category database in accordance with the input; and
selecting at least one subsequent digital image from a third set of digital images based on the updated user profile and category database.

20. A method of selecting a digital image comprising:
receiving, by a computing device, a first set of digital images;
analyzing, by the computing device, the first set of digital images to extract first image features from each of the first set of digital images;
accessing, by the computing device, a user profile stored in a memory, wherein the user profile comprises a preset list of image features corresponding to a second set of digital images previously selected by a user;
comparing, by the computing device, the extracted first image features to the preset list of image features;

ranking, by the computing device, each digital image of the first set based on the comparison;

selecting, by the computing device, each digital image from the first set having a ranking that exceeds a threshold;

assigning, by the computing device, a category to each selected digital image based on a comparison of each selected digital image to a prestored category database of digital image categories;

displaying, by the computing device, each selected digital image with the assigned category on a display device;

receiving, by the computing device, an input from the user in response to the displaying of each selected digital image and the assigned category;

updating, by the computing device, the user profile and the category database in accordance with the input; and selecting, by the computing device, at least one subsequent digital image from a third set of digital images based on the updated user profile and category database.

* * * * *

UNITED STATES PATENT AND TRADEMARK OFFICE
CERTIFICATE OF CORRECTION

| | |
|---|---|
| PATENT NO. | : 9,721,183 B2 |
| APPLICATION NO. | : 14/610955 |
| DATED | : August 1, 2017 |
| INVENTOR(S) | : Noah Raymond Heller et al. |

It is certified that error appears in the above-identified patent and that said Letters Patent is hereby corrected as shown below:

In the Claims

In Column 21, Line 7, in Claim 5, please delete the word "system".

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*